United States Patent [19]
Hickman

[11] 3,830,516
[45] Aug. 20, 1974

[54] INDEPENDENT WHEEL SHEAR RUBBER SPRING SUSPENSION FOR VEHICLES

[75] Inventor: Albert F. Hickman, Eden, N.Y.

[73] Assignee: Hickman Developments, Inc., New York, N.Y.

[22] Filed: Apr. 4, 1973

[21] Appl. No.: 347,793

[52] U.S. Cl. ............................ 280/124 A, 267/63 A
[51] Int. Cl. ............................................. B60g 11/24
[58] Field of Search .......... 280/124 A, 124 R, 81 R; 267/15 R, 63 R, 63 A, 21 R, 21 A, 57 R, 57 A

[56] References Cited
UNITED STATES PATENTS
2,253,217   8/1941   Wenthe .......................... 280/124 A
2,706,113   4/1955   Hickman ........................ 280/124 R Primary Examiner—Philip Goodman
Attorney, Agent, or Firm—Harold I. Popp

[57] ABSTRACT

The vehicle suspension is a so-called independent wheel suspension, each wheel being journalled on a stub axle fixed to the free end of a straight arm extending lengthwise of the line of travel and the other end of which is fixed to a transverse hub member journalled in spaced frame bearings. Substantially the entire resilient support for the frame on its arms is in the form of at least one rectilinear upright movement shear rubber body above each arm inwardly of the corresponding wheel and having opposite generally upright parallel exterior working faces. A plate bonded to one working face connects with the frame and a plate bonded to the other working face connects with the corresponding arm. Desirably the shear rubber bodies are arranged as low and close to the arms as possible to reduce stress thereon; their connection with each arm includes a flexible rubber pad which distorts horizontally to compensate for the changes in effective length of the arms; the shear rubber body working faces are crosswise of the line of vehicle travel; and telescopic shock absorbers are severally between the free ends of their arms and frame brackets which also connect the other parts of the suspension to the frame.

3 Claims, 4 Drawing Figures

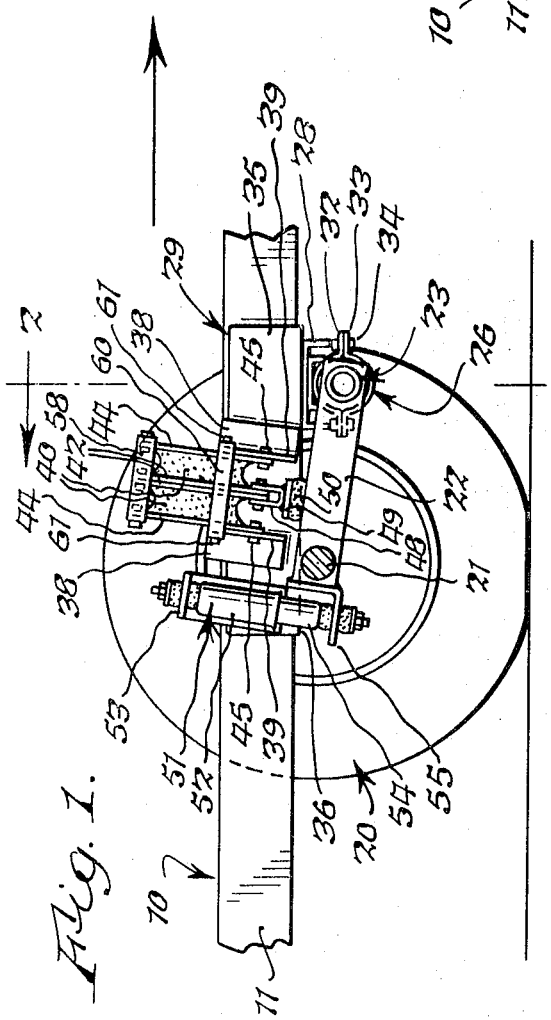

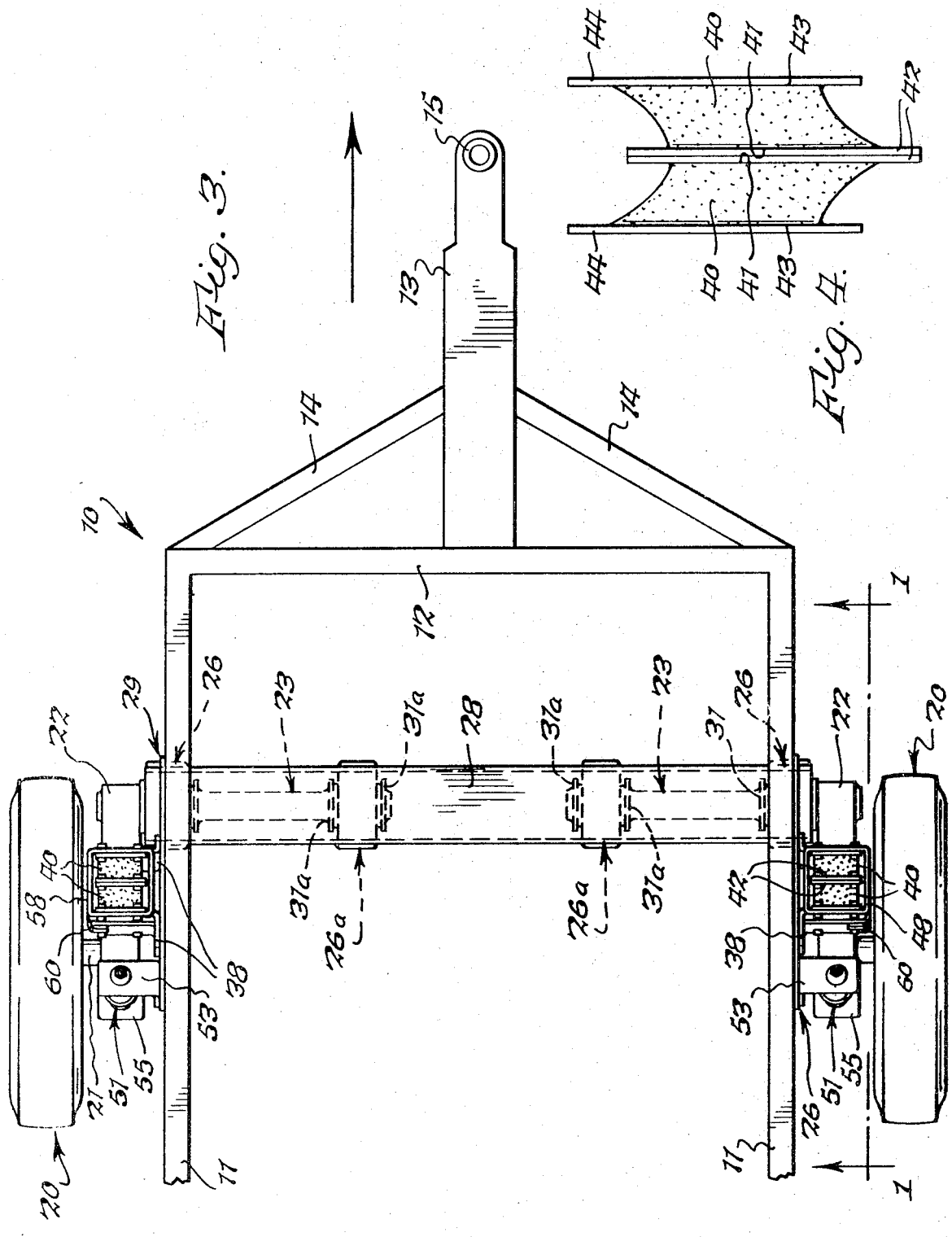

INDEPENDENT WHEEL SHEAR RUBBER SPRING SUSPENSION FOR VEHICLES

An object is to provide a very simple, rugged and friction free independent wheel suspension in which the resilient support for the frame is essentially provided by rectilinear upright movement shear rubber bodies so arranged and connected as to work with minimum stress on any of the suspension parts or the frame.

Another object is to provide such a suspension having a simple means, namely flexible rubber pads, which flex to compensate for changes in position of the parts in action.

Another object is to provide such a suspension which is adapted to standard frame and wheel track widths as well as standard wheel housings.

Other objects and advantages will appear from the following description and drawings in which:

FIG. 1 is a fragmentary side elevational view of a vehicle frame supported at each side by a spring suspension embodying the present invention, this view being taken, for clarity, generally on line 1—1, FIG. 3. In the first three figures the suspension parts are shown in their position in which the frame is carrying a normal load and the forward direction of travel is indicated by a large arrow above the right hand sides of FIGS. 1 and 3. FIG. 2 is an enlarged fragmentary vertical section taken generally on line 2—2, FIG. 1. FIG. 3 is a fragmentary top plan view of the vehicle frame supported by the subject spring suspension. FIG. 4 is an enlarged side elevational view, as viewed in FIG. 1, of one of the rectilinear, vertical movement shear rubber bodies, unstressed, which essentially provide the resilient resistance or support in the suspension.

The vehicle frame can be of any suitable construction and is shown as a trailer frame 10 comprising a pair of main longitudinal horizontal side frame beams 11 which can be connected by cross bars 12 and as having a tongue 13 reinforced by diagonal frame bars 14. Any suitable means 15 can be provided at the front end of the tongue for attachment to the rear of the towing vehicle (not shown).

The entire vehicle frame, together with the present spring suspension, is preferably constructed substantially symmetrically about the vertical center plane of the vehicle frame, and hence the independent wheel suspensions at opposite sides of the frame are substantially identical.

The frame 10 is supported on rubber tired supporting wheels 20, which can be single wheels, as shown, or dual tired wheels, that is, pairs of rim structures bolted together side by side. In either case a stub axle 21 is journalled on each rubber tired wheel in any suitable manner (not shown), these stub axles extending horizontally transversely of the line of vehicle travel.

Each stub axle 21 is welded or otherwise fixed to the outer or free end of an arm 22 which can be of any suitable form but is shown as being of straight form and of tubular rectangular form in cross section with its stub axle extending through its side walls at its outer end and being welded thereto.

A tubular horizontal hub structure 23 is arranged under each main longitudinal side frame beam 11 generally parallel with the axis of rotation of its wheel 20, preferably in advance thereof, with reference to the forward direction of vehicle travel. This hub structure has a cylindrical inboard end 24 projecting toward the vertical center plane of the vehicle frame, and a cylindrical coaxial outboard end 25 projecting outwardly from under its longitudinal side frame beam 11 toward the tire of its wheel 20. This outboard end 25 extends through the side walls of the inner end of the corresponding arm 22 and is welded thereto.

The cylindrical outboard and inboard ends 25, 24 of the two hub structures, through outboard and inboard bearings 26, 26a, respectively, support a cross bolster 28 in the form of an inverted metal channel the opposite ends of which are arranged under the main longitudinal side frame beams 11. Each end of the bolster is suitably secured to the under side of an L-shaped frame bracket, hereinafter described.

The bearings 26, 26a are identical in construction and hence the same description applies to both, the corresponding parts of the bearing 26a being distinguished by the suffix "a." Each outboard bearing 26 comprises a rubber bushing 30 embracing the tubular outboard end 25 of the corresponding hub structure 23 and confined at its ends between a pair of metal rings 31 welded to and projecting radially from the outboard end 25, each pair of these rings serving to prevent the outward axial displacement of the rubber bushing 30 therebetween. Each rubber bushing 30 is embraced by an upper half bearing housing 32 which can be welded inside the outer extremity of the bolster cross channel 28 in any suitable manner and by a lower half bearing housing 33 secured, as by bolts 34, to its upper half bearing housing 32 so as to compress the rubber bushing 30 against the periphery of the outer cylindrical end 25 of its hub member 23.

Each frame bracket 29 is L-shaped in cross section, having a vertical side flange 35 contacting the outer vertical face of its main longitudinal side frame beam 11 and having a horizontal bottom flange 36 contacting the bottom face thereof, this bottom flange also being suitably secured to the corresponding end top face of the bolster channel 28. Each frame bracket 29 is preferably removably secured to the frame by bolts or other means which, for clarity, are not shown.

Each frame bracket 29 extends along its main longitudinal side frame beam 11 from above the cross bolster channel 28 to beyond the outer or free end of its companion tubular arm 22, as best shown in FIG. 1. Near its center one flange of each of a pair of spaced, parallel angle irons 38 is secured to the outer face of the vertical flange 35 of its frame bracket 29 so that its outer longer flange 39 projects outwardly into the space between the frame 10 and wheel 20 above and beyond the corresponding arm 22, as best shown in FIG. 2. Each parallel pair of these angle irons 38 is generally upright, but slope from the true vertical upwardly and forwardly with reference to the forward direction of vehicle travel, as best shown in FIG. 1.

Substantially the entire resilient support for the frame 10 on each of the arms 22 comprises at least one rectilinear upright movement shear rubber body 40, preferably in pairs as best shown in FIG. 4. Each of these bodies is preferably rectangular in cross section transversely of the line of vehicle travel and parallelogram in cross section lengthwise thereof, each rubber body, when unstressed as in FIG. 4, sloping upwardly from an inner rectangular working face 41 bonded to an inner rectangular metal plate 42 to an outer rectangular working face 43 bonded to an outer rectangular metal plate 44. The inner metal plates 42 are fastened together and the outer metal plates are secured by bolts 45 against the opposing faces of the flanges 39 of the frame bracket angle irons 38 as best shown in FIGS. 1 and 2.

A U-shaped yoke 48 embraces and is bolted to the bottom of each pair of inner metal plates 42 and, through a small metal plate 49, carries and is fixed to a downwardly facing resilient rubber pad 50 which is in non-adhering contact with the top side of the companion arm 22 near its center, as best shown in FIGS. 1 and 2. A feature of the invention is that each rubber pad 50 flexes in the direction of vehicle travel to compensate for the effective or theoretical lengthening and shortening of each arm 22 lengthwise of this direction as it moves vertically about its hub structure 23 as its fulcrum.

Each wheel is controlled, especially in its rebound movement, by a telescopic shock absorber 51. Its outer upper telescopic part 52 is secured by any suitable flexible joint to an angle iron 53 fixed to and rising from the rear end of each frame bracket 29. Its inner bottom telescopic part 54 is secured by any suitable flexible joint to an angle iron 55 welded to the rear or free end of each arm 22 to project rearwardly therefrom.

To prevent spreading apart in action of the metal plates 44 of each pair of rubber bodies 40, the tops of these plates are embraced by a square ring 58 secured thereto by bolts 59 and a C-shaped metal clamp 60 embraces the upper outer corners of each pair of angle iron flanges 39 and is secured thereby by bolts 61.

OPERATION

The forward direction of vehicle travel is shown by the large arrows above the right of FIGS. 1 and 3, and in the operation of the suspension, the upward movement of either wheel 20 and its stub axle 21 effects upward movement of the rear or free end of its tubular arm 22 and clockwise movement, as viewed in FIG. 1, of the hub member 23 fixed to this arm, such movement being permitted by the flexible rubber bushings 30, 30a of its outboard and inboard frame bearings 26, 26a.

Through the corresponding rubber pad 50, this movement of each arm 22 is transmitted upwardly to the connected inner centerplates 42 of the companion pair of rectilinear upright movement shear rubber bodies 40. In their unloaded or undistorted condition these rubber bodies are in the parallelogram form shown in FIG. 4. With the vehicle loaded, these bodies are distorted so that their working faces 41, 43 and plates 42, 44 are generally in line with one another, as shown in FIG. 1. With either wheel 20 of the loaded moving vehicle striking a bump in the road, these rubber bodies 40 are further distorted toward a parallelogram condition reverse to that shown in FIG. 4 and with their inner center plates 42 rising above their outer plates 44. Such upward movement of each pair of inner center plates 42 is transmitted through the corresponding pair of rubber bodies 40, and angle irons 38, and L-shaped frame brackets 29 to the main longitudinal side frame bars 11 to which these frame brackets are preferably removably secured in any suitable manner.

The bolster channel 28 is also secured to these frame brackets 29 and since this bolster carries all four rubber bushed frame bearings 26, 26a, it will be seen that the entire suspension, with the wheels 20, can be removed for ready repair or replacement by merely detaching the frame brackets 29 from the frame 10.

The following features will particularly be noted:

It is important that the pair of shear rubber bodies 40, or sandwiches 40, 42, 44, be located between the wheels 20 and the main longitudinal side frame beams 11 in order to have these shear rubber bodies as low as possible with reference to the arms 22. The higher these shear rubber bodies 40, the greater the working stress on them and other parts of the suspension.

While it would be practicable to have the shear rubber bodies 40 set with their working faces 41, 43 or plates 42, 44 parallel with the line of vehicle travel, in such position they would be subjected to undesired torsional or twisting action in addition to their rectilinear shear movement. The arrangement shown in preferred.

The rubber pads 50 distort lengthwise of the line of vehicle travel to compensate for the effective lengthening and shortening of the arms 22, lengthwise of this line, as they rise and fall. Thus as each arm 22 rises from the position shown in FIG. 1, its pad 50 is distorted forwardly of the vehicle due to the decrease in the effective length of the arm 22 and as each arm lowers from the FIG. 1 position the pad is distorted rearwardly of the vehicle to compensate for the increase in the arm's effective length. This fore-and-aft compensating movement of the resilient rubber pads 50 is, of course, very slight.

The entire suspension, including the wheels 20, can be removed by detaching the frame brackets 29 from the frame, and a very simple and effective mounting for each telescopic shock absorber 51 is provided between the ends of its arm 22 and frame bracket 29.

By "rubber" is meant an elastomer such as natural or synthetic rubber or mixtures thereof, and by "wheel" is meant the ground engaging means 20 supporting the stub axles whether in the form of the single wheel shown or in the form of a dual tired wheel.

I claim:

1. A vehicle spring suspension adapted to be interposed between each side of a vehicle frame member and a rubber tired supporting wheel having a road engaging tread, wherein the improvment comprises a generally horizontal hub structure for each suspension arranged under the corresponding side of the frame member and generally parallel with the axis of rotation of its wheel, each hub structure having an inboard end extending toward the vertical center plane of the vehicle frame member and an outboard end projecting outwardly from under said frame member, a relatively straight arm member having one end arranged below the space between each wheel means providing the corresponding side of said frame member and fixed to said outboard end of the corresponding hub structure to project radially therefrom toward said axis of rotation of said wheel, a stub axle projecting horizontally outwardly laterally from the other end of each arm member along said axis of rotation of and journalled on its wheel, an inboard frame bearing connecting said inboard end of each hub structure to the frame member, an outboard frame bearing connecting the outboard end of each hub structure to the frame member, and meanproviding resilient support for the frame member on each of said arm members, comprising at least one rectilinear upright movement shear rubber body arranged above each arm member inwardly of the corresponding wheel and having on its opposite sides generally upright parallel working faces, a bracket fixed to one of said members at each side of said frame member and bonded to one of said working faces of the corresponding shear rubber body, and means operatively connecting the other of said working faces of each shear rubber body to the other of said members, including a rubber pad which is flexed lengthwise of the line of vehicle travel in response to the effective lengthening and shortening of said arm member, lengthwise of the line of vehicle travel, as it swings vertically in its said bearings.

2. A vehicle spring suspension as set forth in claim 1 having a pair of such rectilinear movement shear rubber bodies arranged above each arm member, and wherein said means operatively connecting the other of said working faces of each shear rubber body to the other of said members includes metal plate means bonded to the opposing working faces of each pair of said shear rubber bodies, said rubber pad being operatively interposed between each metal plate means and the corresponding other of said members.

3. A vehicle spring suspension as set forth in claim 2 wherein each of said one of said members to which the corresponding bracket is fixed, is said frame member, and wherein each rubber pad is operatively interposed between each metal plate means and the corresponding arm member.

* * * * *